Oct. 13, 1931.     A. W. SCHOOF     1,826,828
APPARATUS FOR GAUGING AND ADJUSTING ARTICLES
Filed June 22, 1929     2 Sheets-Sheet 1
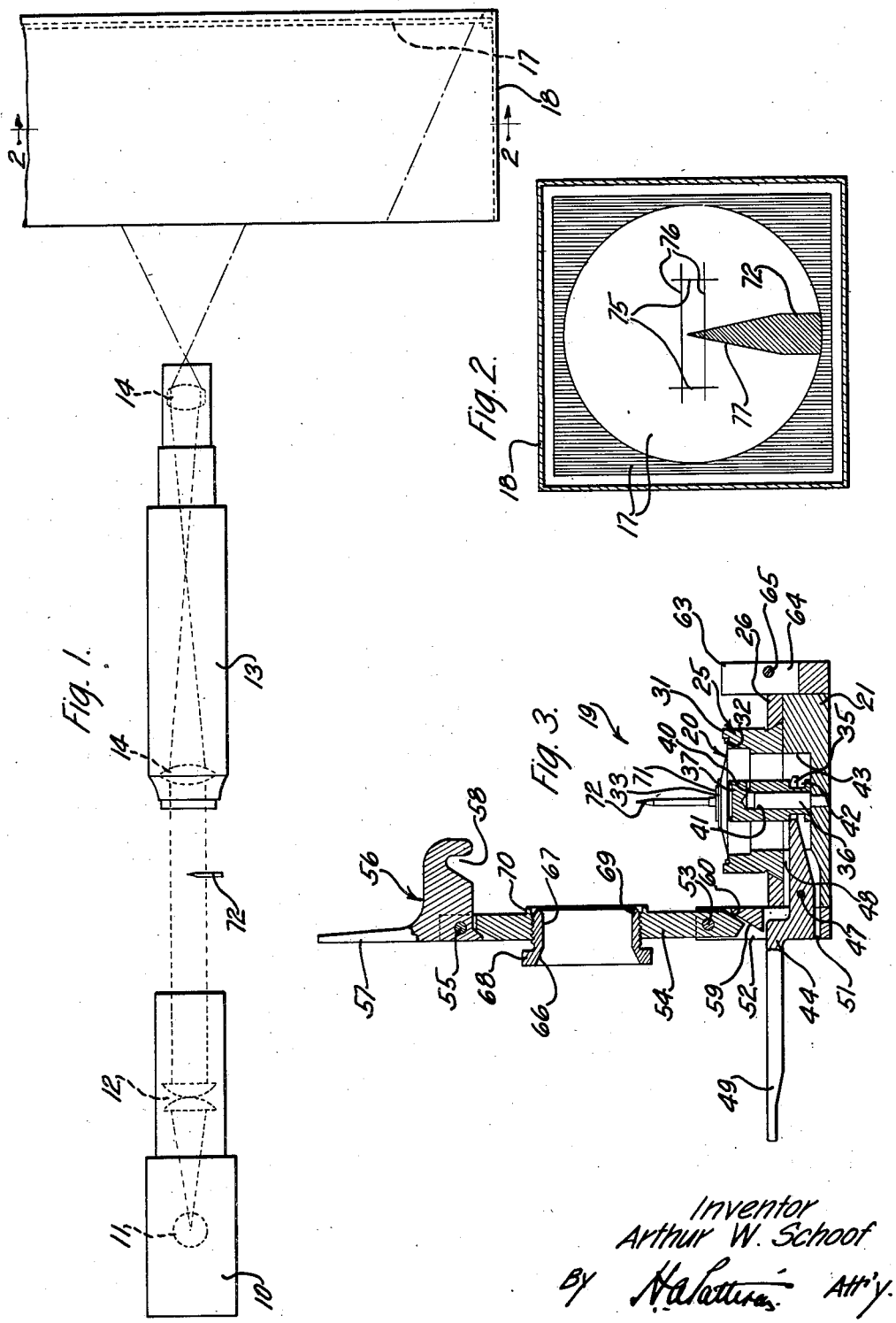
Inventor
Arthur W. Schoof
By [signature] Att'y.

Oct. 13, 1931.  A. W. SCHOOF  1,826,828
APPARATUS FOR GAUGING AND ADJUSTING ARTICLES
Filed June 22, 1929  2 Sheets-Sheet 2
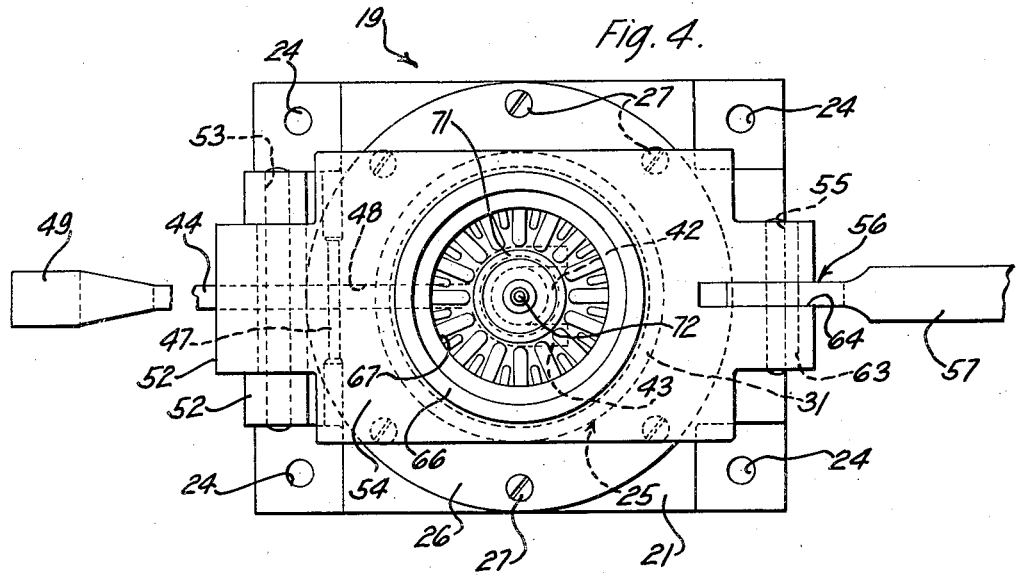
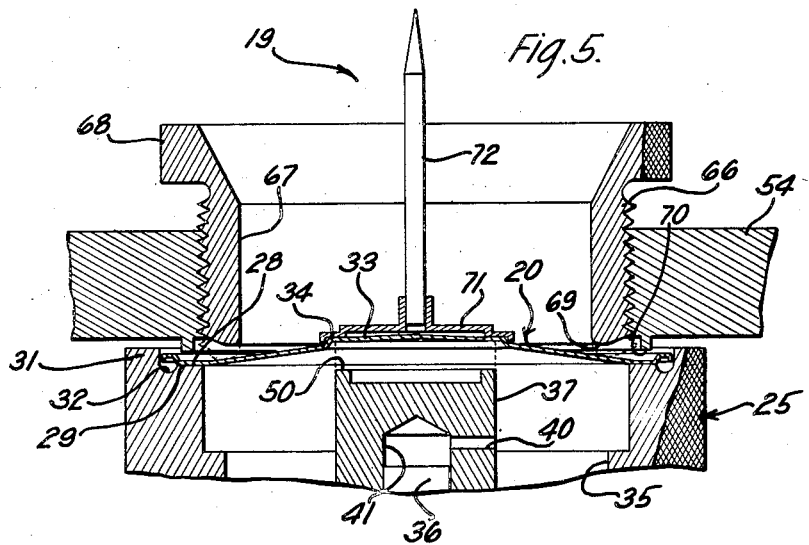
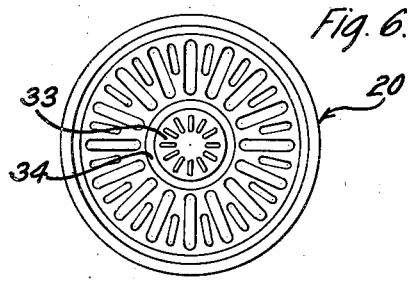
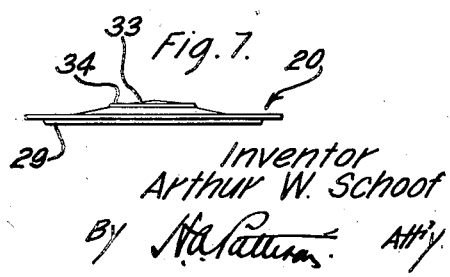
Inventor
Arthur W. Schoof
By N. A. Patterson, Att'y Patented Oct. 13, 1931

1,826,828

UNITED STATES PATENT OFFICE

ARTHUR WILLIAM SCHOOF, OF RIVERSIDE, ILLINOIS, ASSIGNOR TO WESTERN ELECTRIC COMPANY, INCORPORATED, OF NEW YORK. N. Y., A CORPORATION OF NEW YORK

APPARATUS FOR GAUGING AND ADJUSTING ARTICLES

Application filed June 22, 1929. Serial No. 372,999.

This invention relates to apparatus for gauging and adjusting articles, and more particularly to apparatus involving optical systems for determining the dimensions of and adjusting articles to predetermined dimensions.

Diaphragms such as are used in sound transmitting instruments are sometimes formed from thin ductile metal and in order to function properly it is necessary that the seating portions or surfaces which are disposed concentrically in different planes be parallel and predeterminedly spaced from each other.

The primary object of this invention is to provide an improved apparatus for accurately gauging and adjusting articles to predetermined dimensions in a facile manner.

In accordance with the general features of this invention in one embodiment thereof as applied to the gauging and adjusting to predetermined dimensions of articles, such as metal diaphragms of the type hereinbefore referred to, an apparatus is provided which includes means for rotatably supporting a diaphragm upon one of its seating surfaces, the diaphragm being engaged upon another of its seating surfaces with an indicator extending from the seating surface and into the path of a beam of light of an optical projector of the magnifying type. The magnified image of the free end of the indicator is projected onto a screen provided with calibrations indicating tolerance limits for parallelism of and the space between the seating surfaces and by rotating the support a lack of parallelism between the seating surfaces is indicated by a movement of the indicator and if it is without the tolerance limits the diaphragm is rejected. If the indicator shows upon the screen that the space between the seating surfaces is less or greater than the tolerance limits, the diaphragm is manipulated or adjusted by pressing thereon in opposite directions by cooperating movable means arranged at opposite sides of the diaphragm until the space between the seating surfaces is within the tolerance limits as indicated upon the screen.

Other objects and advantages of this invention will more fully appear from the following detailed description taken in connection with the accompanying drawings, in which Fig. 1 is a diagrammatic fragmentary side view of an optical system and indicator of the apparatus embodying the features of this invention as applied to the gauging and adjusting of diaphragms used in sound transmitting instruments;

Fig. 2 is a vertical section on a reduced scale taken on the line 2—2 of Fig. 1, showing the screen with the calibrated tolerance limits and the magnified image of the indicator of the apparatus;

Fig. 3 is a vertical central section through the gauging and adjusting apparatus with a diaphragm in gauging position thereon;

Fig. 4 is an enlarged plan view of the apparatus shown in Fig. 3 when being used to adjust the diaphragm;

Fig. 5 is an enlarged fragmentary vertical detail sectional view of Fig. 3 with the apparatus shown in position for adjusting a diaphragm;

Fig. 6 is a plan view on a reduced scale of the diaphragm shown in section in Fig. 5, and Fig. 7 is a side view thereof.

Referring now to the drawings in detail wherein like reference numerals indicate similar parts throughout the several views, and particularly to Fig. 1, which diagrammatically illustrates the optical system, a housing 10 contains a lamp 11 for emitting a light beam of high intensity. The light beam passes from the housing 10 through condensing lenses 12, a beam passing from the lenses and through a projector 13 having a plurality of lenses 14 for projecting a magnified image, to be presently described, upon a screen 17 mounted in a housing 18 adapted to shield the screen from external direct lighting so that the projected image will be clearly revealed upon the screen. The screen 17 may be of ground glass or other suitable material.

The optical system may be mounted on a supporting member (not shown) and in the particular application thereof may be arranged as a bench type apparatus, although in the drawings it is shown in diagrammatic form for the sake of simplicity. Also mounted on the supporting member between the lenses 12 and 14 is a fixture 19 (Figs. 3, 4 and 5) upon which the article, in the present application of the invention a metal diaphragm 20 (Figs. 6 and 7), for use in sound transmitting instruments, is supported during the gauging and adjusting operations thereof. The fixture 19, referring particularly to Figs. 3 and 4, comprises a base member 21, which may be secured in a fixed position upon the supporting member by fastening means (not shown) projecting through apertures 24 in the base member. Rotatably mounted upon the upper surface of the member 21 is a ring 25 retained in position thereon by cooperating outer and inner annularly disposed peripheral surfaces of the ring 25 and a surrounding ring 26, respectively, the latter being secured to the upper surface of the member 21 by screws 27 (Fig. 4). The upper surface of the ring 25 is provided with a continuous annular surface 28 for supporting the diaphragm 20 which rests upon an outer annular seating portion or surface 29 provided on one side thereof adjacent its periphery in a predetermined vertical plane with respect to calibrated tolerance limits provided on the screen 17. The surface 29 is one of the surfaces to be gauged by the apparatus of this invention and will be referred to hereinafter. The diaphragm 20 is centered with respect to the axis of the ring 25 and prevented from moving in a horizontal direction thereon by means of a continuous flange 31 surrounding the surface 28 and slightly spaced from the periphery of the diaphragm 20. A continuous annular groove 32 is formed in the upper surface of the ring 25 intermediate the surface 28 and the flange 31 for clearance purposes. The peripheral surface of the ring 25 is knurled, as shown fragmentarily in Fig. 5, for facilitating the rotation of the ring when gauging the parallelism of the surfaces of the diaphragm 20, which operation will be described hereinafter. The diaphragm 20 is formed with a central raised portion 33 upon which, adjacent its periphery, is provided an inner annular seating portion or surface 34 arranged upon the side of the diaphragm opposite to the seating surface 29 hereinbefore described, the surfaces 29 and 34 being coaxial. The surface 34 is another surface to be gauged in the method of this invention and will be referred to hereinafter. In some instances the diaphragm 20 is made from thin ductile metal and in order to function properly in the sound transmitting instrument to which it is applied it is necessary that the seating portions or surfaces 29 and 34 which, as clearly shown in Fig. 5, are disposed concentrically and in different vertical planes, be parallel and predeterminedly spaced from each other.

The base member 21 (Fig. 3) is provided with a circular depression 35 which is aligned with the inner periphery of the ring 25. Fixed to the base 21 axially of the depression 35 and the ring 25 is a vertical post 36 upon which is slidably and rotatably carried a forming or adjusting member 37 normally resting at its lower end upon the bottom wall of the depression 35. An air vent 40 formed in the member 37 connects with an aperture 41 thereof, in which fits the post 36, the post not quite reaching the inner end of the aperture and disposed below the vent. This arrangement provides an escape for air which might be trapped between the member 37 and the upper end of the post 36, so that the member will freely move upon the post during the operation of the fixture 19, to be described hereinafter. Adjacent its lower end the member 37 upon its periphery is provided with an annular channel 42 into which extends at opposite sides thereof (Fig. 4) furcations 43 of a bifurcated lever 44 pivoted at 47 to the base member 21 within a slot 48 formed therein. At its outer end the lever 44 is provided with a handle portion 49 and it will be apparent, referring to Fig. 3, upon applying pressure thereto in a downward direction that the inner bifurcated end thereof will swing upwardly and raise the member 37. The upper end of the member 37 is provided with a continuous annular wall 50 flush with the periphery of the member and having a flat horizontal surface at its extreme end which engages a portion of the diaphragm 20 opposite the surface 34 thereof during one adjustment of the diaphragm. The downward movement of the lever 44 is limited by a lower shouldered corner 51 thereof coming into contact with the bottom wall of the slot 48, which also extends through a vertical post 52 attached to the left end of the base member 21 (Fig. 3), the purpose of which will be referred to hereinafter. When the forming or adjusting member 37 is normally resting upon the base member 21, as shown in Fig. 3, the upper surface of the furcations 43 of the lever 44 are engaged with the upper end wall of the channel 42 of the member 37 so that no lost motion occurs when depressing the handle 49 of the lever, the forming or adjusting member immediately moving upwardly.

Pivoted at 53 upon the post 52, which is slotted at its upper end, is a lever or leaf 54 having pivoted at its free end, as shown at 55, a pivotal latch 56 provided with a handle portion 57 and a latching portion 58. The leaf 54 stands in a vertical position, as shown in Fig. 3, but when in its normal position is slightly inclined to the left, in which position cooperating surfaces 59 and 60 provided upon the post 52 and the inner end of the leaf, respectively, engage and hold it in this position. At the right end of the base member 21 opposite the vertical post 52 is a vertical post 63 provided with a slot 64 for receiving the latch 56 when the leaf 54 is swung downwardly to the right, as viewed in Fig. 3, the latch portion 58 latching under a pin 65 carried by the post 63 and extending across the slot 64 thereof.

Threaded into an aperture formed in the leaf 54 between the pivot 53 and the latch 56 is a circular nut 66 with a comparatively large axial aperture 67 formed therein. The outer end of the nut 66 has a knurled peripheral portion 68 for the purpose of facilitating the turning of the nut when operating the fixture 19 to be described hereinafter. A continuous annular smooth rounded surface 69 is provided on the inner end of the nut 66 which engages a portion of the diaphragm 20 intermediate the surfaces 29 and 34 during one adjustment of the diaphragm. Upon the inner or lower surface of the leaf 54, as viewed in Fig. 5, and concentric with and surrounding the aperture provided in the leaf for the nut 66 is formed a continuous annular wall 70 having a flat end surface which is parallel to the surface 28 of the ring 25 when the leaf is in its latched position and opposite the surface 29 of the diaphragm 20 during one adjustment thereof. When the leaf 54 is in its latched position, as shown in Figs. 4 and 5, the axis of rotation of the nut 66 and the annular surface 69 at its inner end will be coincident with the vertical axis of the rotatable ring 25 supporting and centering the diaphragm 20, which as hereinbefore described is provided with the outer and inner coaxial oppositely disposed annular seating portions or surfaces 29 and 34.

Freely resting upon and centered with the surface 34 of the diaphragm 20 is a disk 71 having fixed coaxial thereto a vertical indicator 72, the disk and the indicator together having a predetermined weight equivalent to the pressure exerted normally on the central portion 33 of the diaphragm when in use in a sound transmitting instrument which permits the gauging and adjusting of the diaphragm under conditions substantially the same as when it is in use.

In Fig. 2 is illustrated an elevational view of the screen 17 which has marked thereon a pair of parallel vertical gauging lines 75 indicating tolerance limits for parallelism between the surfaces 29 and 34 and also a pair of parallel horizontal gauging lines 76 indicating tolerance limits for the space between the surfaces, the lines 75 and 76 being suitably calibrated in accordance with the particular article and dimensions or other characteristics thereof to be gauged.

In gauging and adjusting diaphragms 20 of the type hereinbefore described it will be understood that the fixture 19, as hereinbefore mentioned, is mounted on a common supporting member (not shown) with the elements of the optical system in a predetermined relation therewith. In this relation the vertical axis of rotation of the ring 25 is arranged at right angles to and intersects the horizontal axis of the beam of light passing from the condensing lenses 12 to the lenses 14 of the projector 13. With the leaf 54 of the gauging and adjusting fixture 19 in its normal raised position slightly inclined to the left from the position thereof as shown in Fig. 3 and correctly related to the optical system the lamp 11 of the latter is turned on and the beam of light passes between the lenses 12 and 14 and onto the screen 17.

A diaphragm 20 is then positioned on the surface 28 of the ring 25 and centered by the flange 31 with the central raised portion 33 thereof facing upwardly, as hereinbefore described. Thereafter the disk 71 carrying the vertical indicator 72 is freely mounted on the diaphragm 20 at the central portion 33 thereof and in engagement with a substantial area thereof, the upper end of the indicator extending into the path of the beam of light between the lenses 12 and 14, as clearly shown in Fig. 1, whereupon a magnified image 77 of this portion of the indicator will be projected onto the screen 17, as shown in Fig. 2. The operator then rotates the ring 25 by grasping the knurled periphery thereof and if the image 77 of the indicator 72 during the rotation of the diaphragm moves laterally between the vertical limit lines 75 a lack of parallelism of the surfaces 29 and 34 of the diaphragm is indicated and if the movement is such that the image moves outside the vertical tolerance limits, the particular diaphragm is considered defective and is removed from the fixture.

If the image 77 of the indicator 72 moves between the tolerance limits 75 during the rotation of the diaphragm 20 the surfaces 29 and 34 of the diaphragm are considered to be sufficiently parallel to permit the use of the diaphragm and it is left in position on the ring 25. The operator next observes whether the image 77 of the indicator 72 lies between the horizontal limit lines 76, as shown in Fig. 2, and if it does, the space between the surfaces 29 and 34 is within the predetermined dimension and the diaphragm is considered satisfactory with respect to this particular dimension between the surfaces and also as to their parallelism.

Should the image 77 of the indicator 72 lie below the lower limit line 76 the leaf 54 of the fixture 19 is latched down into the position shown in Figs. 4 and 5 in the manner hereinbefore described and downward pressure is applied by the operator to the handle portion 49 of the lever 44. The forming or adjusting member 37 is thus moved upwardly, bringing the upper flat surface of the annular wall 50 into engagement with the central portion 33 of the diaphragm 20 at a point opposite the surface 34, first moving the diaphragm bodily upwards until the surface thereof opposite to the surface 29 engages the flat end surface of the annular wall 70 of the leaf 54. The continuing upward movement of the member 37 raises the central portion 33 of the diaphragm 20 to a higher level, the peripheral portion of the diaphragm adjacent the surface 29 being held back by its engagement with the wall 70 and the material of the diaphragm will be manipulated or formed annularly around the inner edge of the wall 70. It is to be understood that at this time the nut 66 is at such a level in the leaf 54 which will prevent the diaphragm 20 from engaging with the annular surface 69 of the leaf. Hand pressure is then removed from the handle portion 49 and the member 37 moves downwardly to its normal position and the position of the image 77 of the indicator 72 is again observed. If the image 77 is still below the lower limit line 76 the operation just described is repeated with a slightly increased pressure upon the handle portion 49 and if necessary again repeated until the image shows between the limit lines 76.

In case the image 77 of the indicator 72 lies above the upper limit line 76 either in the first instance or during the forming operation first described, the adjustment of the diaphragm is made in the following manner: The leaf 54 if not in its latched position is moved thereto and the operator then proceeds to turn the nut 66 downwardly in the leaf to engage the annular surface 69 thereof with the portion of the diaphragm 20 intermediate the surfaces 39 and 34. A continued rotation of the nut 66 lowers the central portion 33 of the diaphragm 20, manipulating or forming it annularly around the inner edge of the surface 28 of the ring 25 upon which rests the surface 29 of the diaphragm. The nut 66 is then rotated in a reverse direction, drawing the annular surface 69 sufficiently away from the diaphragm so that it will not be influenced thereby and the image 77 of the indicator 72 is again observed. Should the image 77 still be above the upper limit line 76 the operation just described is repeated, the nut 66 being lowered a slightly greater distance, and if necessary again repeated until the image shows between the limit lines 76. This completes the gauging and adjusting of the diaphragm 20 by means of the apparatus and thereafter the leaf 54 is unlatched by pulling upwardly upon the handle portion 57 of the pivotal latch 56 and the leaf is then raised to its substantially vertical position. To raise the diaphragm 20 from the ring 25 the lever 44 is operated by pressing downwardly upon the handle portion 49, the operator then removing the diaphragm while in its raised position.

From the foregoing description it will be apparent that means is provided for accurately gauging and adjusting diaphragms of the described type to predetermined dimensions in a facile manner.

Although the invention as herein illustrated and described is particularly well adapted for use in connection with the gauging and adjusting of a particular type of diaphragm for use in sound transmitting instruments, it should be understood that the novel features thereof are capable of being applied to the gauging and adjusting of other types of diaphragms, as well as that of other articles or other applications and should be limited only by the scope of the appended claims.

What is claimed is:

1. In an apparatus for gauging the distance between spaced portions of an article, a screen having indicated thereon calibrated tolerance limits for the distance to be gauged, means associated therewith with which one portion of the article is engaged for predeterminedly locating it with respect to the tolerance limits, and means resting freely on the article being gauged and capable of assuming a position in accordance with the relative positions of the portions being gauged for producing an image on the calibrated screen of the resulting position thereof.

2. In an apparatus for gauging the space between parallel surfaces of an article, a screen having indicated thereon calibrated tolerance limits for the space to be gauged, means associated therewith for predeterminedly supporting one of the parallel surfaces of the article with respect to the tolerance limits, means supported on the other surface and capable of assuming different positions in different planes having a point spaced from the latter surface and in position for imaging upon the screen, and means for producing an image of the positioned point on the calibrated screen.

3. In an apparatus for gauging the space between surfaces of an article disposed concentrically and in different planes, a screen having indicated thereon horizontally disposed calibrated tolerance limits for the space to be gauged, a support associated therewith on which one surface of the article rests predeterminedly positioned with respect to the tolerance limits, means supported on the other surface and capable of assuming different positions in different planes having a vertical indicator extending from the latter surface and terminating in a point in position for imaging upon the screen, and means for producing an image of the indicator point on the calibrated screen.

4. In an apparatus for gauging the parallelism between surfaces of an article, a screen having indicated thereon calibrated tolerance limits for parallelism between the surfaces of the article, means associated therewith for rotatably supporting the article with one of the surfaces predeterminedly positioned with respect to the tolerance limits, an indicator engaging a substantial area of the other surface having a point spaced from the latter surface and positioned for imaging upon the screen, and means for producing an image of the positioned point on the calibrated screen during rotation of the article.

5. In an apparatus for gauging the parallelism between surfaces of an article, a screen having indicated thereon vertical calibrated tolerance limits for parallelism between the surfaces of the article, means associated therewith for rotatably supporting the article upon its vertical axis, the article resting on one of its surfaces in a horizontal plane and centered with the vertical tolerance limits, an indicator supported on a substantial area of the other surface having a point thereof spaced from the latter surface, arranged coaxial with the surfaces and positioned for imaging upon the screen, and means for producing an image of the positioned point on the calibrated screen during rotation of the article and the indicator.

6. In an apparatus for simultaneously gauging the parallelism and the space between surfaces of an article disposed in different parallel planes, a screen having indicated thereon a series of angularly arranged calibrated tolerance limits for parallelism between the surfaces of the article and gauging the space therebetween, means associated therewith for rotatably supporting the article with one of the surfaces predeterminedly positioned with respect to one of the series of tolerance limits, an indicator engaging a substantial area of the other surface having a point spaced from the latter surface, centered with the other series of tolerance limits, and positioned for imaging upon the screen, and means for producing an image of the positioned point on the calibrated screen during rotation of the article whereby the position of the point with respect to each series of tolerance limits may be simultaneously observed.

7. In an apparatus for gauging and adjusting the space between surfaces of an article disposed in different planes, a screen having indicated thereon calibrated tolerance limits for the space to be gauged, means associated therewith with which one surface of the article is engaged for predeterminedly locating it with respect to the tolerance limits, means with which the other surface is engaged having a point spaced from the latter surface and in position for imaging upon the screen, means for producing an image of the positioned point on the calibrated screen, and means axially arranged with the surfaces of the article and movable into engagement with opposite portions thereof for applying a forming pressure thereto for adjusting the space between the surfaces and in a direction depending on whether the tolerance limits have been exceeded.

8. In an apparatus for gauging and adjusting the space between surfaces of an article disposed concentrically and in different planes, a screen having indicated thereon calibrated tolerance limits for the space to be gauged, a frame associated therewith provided with an aperture surrounded at one end by a seating portion for predeterminedly locating one surface of the article with respect to the tolerance limits, means supported on the other surface having a point spaced from the latter surface and in position for imaging upon the screen, means for producing an image of the positioned point on the calibrated screen, oppositely disposed movable members engageable with opposite portions of the article and disposed concentrically with the surfaces thereof for applying a forming pressure to the article for adjusting the space between the surfaces, one of the movable members operable within the aperture of the frame, and means for operating the members to increase or lessen the space between the surfaces of the article in accordance with the indication on the screen.

9. In an apparatus for gauging the parallelism between surfaces of an article, a screen having indicated thereon calibrated tolerance limits for parallelism between the surfaces of the article, means associated therewith for rotatably supporting the article with one of the surfaces predeterminedly positioned with respect to the tolerance limits, an indicator having a base portion of substantial diameter engaging the other surface and having a point coaxial with the base portion and capable of assuming a position in accordance with the relative position of the surfaces being gauged for producing an image on the calibrated screen of the resulting position thereof..

In witness whereof, I hereunto subscribe my name this 12th day of June, A. D. 1929.

ARTHUR WILLIAM SCHOOF.